(12) United States Patent
Moens et al.

(10) Patent No.: US 10,705,108 B1
(45) Date of Patent: Jul. 7, 2020

(54) SENSING SYSTEM FOR SENSING STATIONARY OBJECTS

(71) Applicant: Honeywell International Inc., Morris Plains, NJ (US)

(72) Inventors: Francois-Christophe Moens, Toronto (CA); Sean McGuire, St. Albert (CA)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/268,160

(22) Filed: Feb. 5, 2019

(51) Int. Cl.
| G01P 13/00 | (2006.01) |
| G01J 5/10 | (2006.01) |
| G01J 5/00 | (2006.01) |
| G01V 8/20 | (2006.01) |

(52) U.S. Cl.
CPC ............ G01P 13/00 (2013.01); G01J 5/0025 (2013.01); G01J 5/10 (2013.01); G01V 8/20 (2013.01)

(58) Field of Classification Search
CPC ........ G01V 8/10; G01J 1/4204; G01J 5/0025; G01J 5/025; G01J 1/0266; G01J 1/4228; G01J 5/34; G01J 5/10; G01P 13/00
See application file for complete search history.

(56) References Cited

U.S. PATENT DOCUMENTS

| 7,552,030 B2 | 6/2009 | Guralnik et al. |
| 9,098,993 B2 | 8/2015 | Reed, Jr. |
| 9,685,065 B2 | 6/2017 | Diels |
| 2004/0030531 A1 | 2/2004 | Miller et al. |
| 2011/0295583 A1* | 12/2011 | Hollock ............. G06K 9/00335 703/11 |
| 2014/0266693 A1 | 9/2014 | Moulton |
| 2015/0022316 A1* | 1/2015 | Dixon .................. G08B 25/001 340/5.51 |
| 2015/0156567 A1 | 6/2015 | Oliver et al. |
| 2016/0027278 A1 | 1/2016 | McIntosh et al. |
| 2017/0323376 A1* | 11/2017 | Glaser ................ G06Q 30/0635 |
| 2018/0005382 A1* | 1/2018 | Wang ..................... H04N 5/332 |
| 2018/0053397 A1* | 2/2018 | Kaur ...................... G08B 21/24 |
| 2019/0035250 A1 | 1/2019 | Hunter et al. |
| 2019/0323897 A1* | 10/2019 | Wang ........................ G01J 5/34 |

OTHER PUBLICATIONS

"White Paper: Usage of D6T-44L/ D6T-8L Thermal Sensor," OMRON Corporation, 18 pages, 2013.
"MEMS: Thermal Sensors-D6T," OMRON C Electronic Components LLC, 7 pages, Nov. 2012.

* cited by examiner

Primary Examiner — David P Porta
Assistant Examiner — Fani Boosalis

(57) ABSTRACT

Sensing systems and methods for sensing a stationary individual. A sensing system may use a first sensor to determine whether a detected thermal signature is associated with a human presence within a space. When the detected thermal signature is not associated with a human presence, the sensing system may repeat the determining whether a detected thermal signature is associated with a human presence. When the detected thermal signature is associated with a human presence, the sensing system may determine whether motion has been detected using a second sensor. In some cases, the first sensor may be a thermal sensor that can detect a human whether the moving or not, and the second sensor may be a motion sensor that only detects motion.

20 Claims, 6 Drawing Sheets

SENSING SYSTEM FOR SENSING STATIONARY OBJECTS

TECHNICAL FIELD

The present disclosure relates generally to sensing systems, and more particularly to object detection and object motion sensing systems.

BACKGROUND

Cardiac arrest, allergic reactions, and drug overdoses can result in a motionless individual. There is an on-going and escalating opioid crisis which is a driving cases of motionless individuals in need of medical assistance. In Canada, there has been an increase in apparent opioid-related deaths in recent years. For example, in 2016 there were an estimated 2,991 opioid-related deaths and in 2017 there were an estimated 3,961 opioid-related deaths. In the first half of 2018, there was an estimated ten percent (10%) increase in opioid-related deaths over the same months in 2017. In the United States, it is estimated that 78 people die every day as a result of opioid-related overdoses. In 2016 there were an estimated 42,249 opioid-related deaths in the United States and in 2018 there were an estimated 49,068 deaths. The average national rate of opioid-related deaths in Canada and the United States were estimated to be 10.8 per 100,000 people and 15.1 per 100,000 people, respectively.

Aside from the horrific loss of life due to the opioid epidemic, there are collateral losses such as emotional distress of those who know the victim or of those that found the victim. There are substantial financial costs including loss of business (e.g., when an overdose occurs at a place of business and at the business that victim worked), support for those affected by opioid-related deaths, and potential lawsuits resulting from opioid-related deaths.

SUMMARY

The present disclosure relates generally to sensing systems, and more particularly to object detection and object motion sensing. In one example, a sensing system may include a first sensor, a second sensor, and a controller operatively coupled to the first sensor and the second sensor. The first sensor may be configured to sense a measure of a surface temperature of an object and provide an output related to the surface temperature of the object even when the object is not moving. The second sensor may be configured to detect motion of the object and to output a signal indicating movement and/or non-movement of the object. The controller may be configured to determine whether an object is present based on the output related to the surface temperature of the object from the first sensor and when the object is determined to be present, determine when the object has been stationary for at least a predetermined period of time based on the output indicating movement and/or non-movement of the object from the second sensor. The controller may be further configured to output an alarm condition when the object is determined to be present and when it is determined that the object has been stationary for at least a predetermined period of time.

In another example, a method of detecting a stationary human in a defined space may include determining whether a detected thermal signature in a field of view is associated with a human presence in the defined space. When the detected thermal signature in the field of view is not associated with a human presence, repeating the determining whether a detected thermal signature in a field of view is associated with a human presence in the defined space. When the detected thermal signature in the field of view is associated with a human presence, determining whether motion has been detected in the field of view. When motion has not been detected in the field of view for at least a predetermined amount of time, outputting an alarm condition.

In another example, a system for sensing a motionless human in a defined space may include a thermal sensor, a motion sensor, and a controller in communication with the thermal sensor and the motion sensor. The thermal sensor may have an array of sensor pixels, where each sensor pixel may be configured to sense surface temperature of objects in a field of view associated with the sensor pixel. The motion sensor configured to sense motion of objects within the defined space. The controller may be configured to determine when a human is in the defined space based on an output from the thermal sensor. When a human is determined to be in the defined space, the controller may determine when the human moves in the defined space based on an output from the motion sensor. Further controller may be configured to determine when a human is present in the defined space and has not moved in the defined space for at least a predetermined amount of time, and output an alarm condition after it is determined that a human is present in the defined space and has not moved in the defined space for at least a predetermined amount of time.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
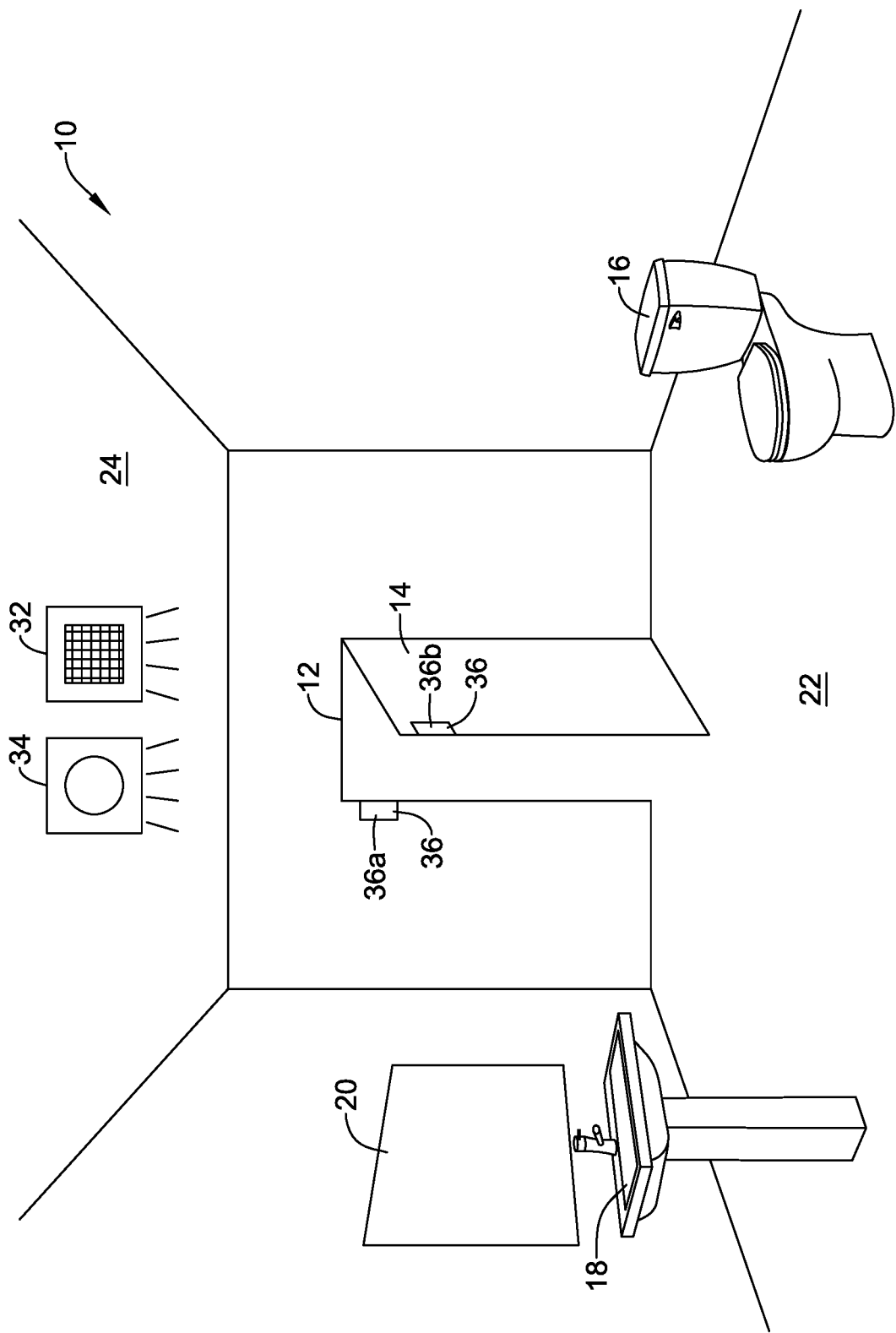
FIG. 1 is a schematic diagram of a bathroom with an illustrative sensing system installed.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

Individuals in need of medical assistance may be in locations that are not being directly or indirectly monitored for one or more reasons (e.g., privacy concerns, monitoring may not be feasible, etc.) For example, cardiac arrests, allergic reactions, drug overdoses, etc. may occur in individuals when the individual is not being directly or indirectly monitored and thus, medical assistance may be slow to arrive for such individuals. In one example, public bathrooms in hospitals, coffee shops, transportation facilities, shopping malls, and/or other bathroom facilities may be locations that are not typically actively monitored for medical assistance needs due to privacy and/or cost concerns. As a result, if an individual has a medical concern and is unable to move (e.g., goes into cardiac arrest, has an allergic reaction, overdoses on drugs, and so on), medical assistance may not arrive in time to save the individual's life. As such, it has been found that it would be desirable to be able to detect when a particular object is present within a space (e.g., a human and/or other suitable object is present with the space) and when the object is determined to be present in the space, detect when the object is not moving over a period of time.

FIG. 1 depicts a schematic view of a bathroom 10 that may include a portion of an installed sensing system that is configured to detect when a human and/or other suitable object is present and not moving. The bathroom 10 may include a doorway 12, a door 14, a toilet 16, a sink 18, a mirror 20, and/or one or more other suitable components of a bathroom. Among other features, the portion of the sensing system that may be located in the bathroom may include a first sensor 32, a second sensor 34, an optional third sensor 36, and/or one or more other sensors that may be different than and/or duplicates of the first sensor 32, the second sensor 34, and/or the optional third sensor 36. In some cases, the optional third sensor 36 may include a sensing element 36a and a sensed element 36b, but this is not required. In one example, the third sensor 36 may be a door position sensor configured to detect when the bathroom door 14 is in a closed position. In such an example, the third sensor 36 may include one of the sensing element 36a and the sensed element 36b positioned on, in, and/or otherwise adjacent to the doorway 12 and the other of the sensing element 36a and the sensed element 36b on, in, and/or adjacent the door 14 such that the sensing element 36a senses a relative position of the sensed element 36b to determine a closed position of the door 14. This is just one example, and other configurations of door sensors are contemplated.

The first sensor 32 and the second sensor 34 may collectively be configured to detect a presence of a human or other object and when the present human or object is not moving (e.g., is stationary). In one example, one of the first sensor 32 and the second sensor 34 may be a thermal sensor configured to sense a thermal property of a human or other suitable object (e.g., such as a surface temperature of a human or other suitable object) and the other of the first sensor 32 and the second sensor 34 may be configured to sense motion or lack of motion of the human or other suitable object. Although the first sensor 32 and the second sensor 34 are used to sense a presence of a human or other suitable object and movement of the human or other suitable object.

The first sensor 32 and the second sensor 34 may be positioned at any suitable location within the bathroom 10 or other suitable space. In some cases, the one or both of the first sensor 32 and the second sensor 34 may have a field of view (e.g., a field of view forming a field of view of the sensing system and the first sensor 32 and the second sensor 34 may be positioned at a location within the bathroom 10 such that the respective fields of view cover an entirety or at least a portion of an area within which a human or other suitable object may be located while in a non-moving state and in need of medical attention (e.g., locations in the bathroom 10 where the human or other suitable object may end up being motion-less and in need of medical attention). In one example, the first sensor 32 and/or the second sensor 34 may be positioned in the bathroom 10 such that the field of views of the first sensor 32 and the second sensor 34, respectively, may cover an entirety of a floor 22 of the bathroom 10. Additionally or alternatively, the first sensor 32 and/or the second sensor 34 may be positioned or located on, in, and/or adjacent to a ceiling 24 of the bathroom 10 and point in generally a downward direction. As depicted in FIG. 1, the first sensor 32 and the second sensor 34 are positioned at or adjacent a center of the ceiling 24 in the bathroom 10. In another example, one or both of the first sensor 32 and the second sensor 34 may be pointed at a forty-five (45) degree angle to the floor such that each sensing component of a sensor may a detect a portion of the bathroom 10 or other suitable space and a field of view of the overall sensor covers an entirety of the bathroom 10 or other suitable space. Additionally or alternatively, one or both of the first sensor 32 and the second sensor may be configured to and/or positioned within the bathroom 10 and/or other suitable space to cover a partitioned portion of the bathroom 10 and/or other suitable space (e.g., a bathroom stall or other suitable partitioned portion of a space). These are just examples.

Figure 2:
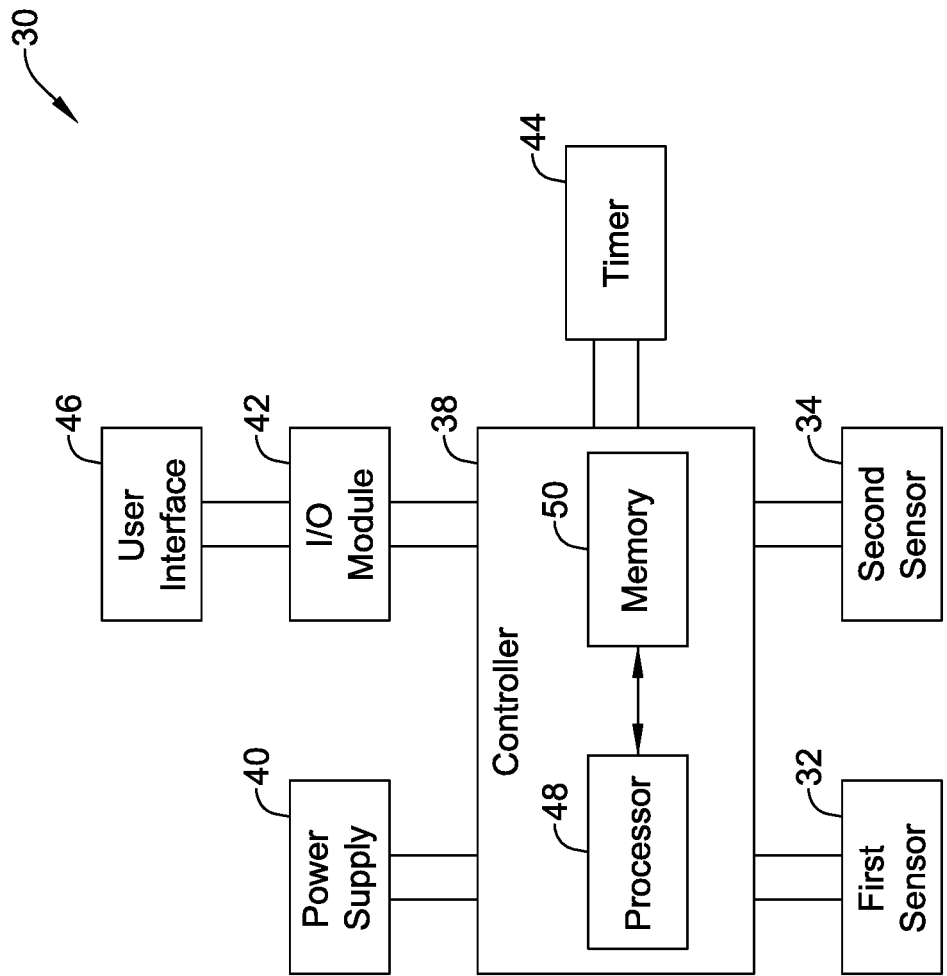
FIG. 2 is a schematic block diagram of an illustrative sensing system.

FIG. 2 is a schematic block diagram of an illustrative sensing system 30 that may include the first sensor 32 and the second sensor 34. In addition to including the first sensor 32 and the second sensor 34, the sensing system 30 may include a controller 38, a power supply connector or a power supply 40, an input/output (I/O) module 42, a timer 44, an optional user interface 46, and/or one or more other suitable components. The controller 38 may be operatively coupled to the other components of the sensing system 30 and may include a processor 48 and memory 50 in communication with the processor 48. Although not depicted in FIG. 2, the controller 38 and/or other portion of the sensing system 30 may include a communications module configured to communicate with one or more other computing devices over a wired or wireless connection and/or network.

The power supply connector or power supply 40 may be configured to provide or facilitate providing suitable power to the sensing system 30. In one example, the power supply 40 may be connected to the controller 38 or other suitable component of the sensing system 30 and configured to supply or facilitate supplying 120 volts of AC power to the sensing system 30. In other cases, the power supply 40 may supply 24 volts of AC power or any other desired voltage. In some cases, the power supply 40 may include a battery that supplies 3 volts, 5 volts, 9 volts or any other suitable DC power. These are just examples.

The I/O module 42 may be configured to receive one or more signals from and/or provide one or more signals to the user interface 46, as shown in FIG. 2, and/or other components of the sensing system 30. In one example, the I/O module 42 may communicate with the user interface 46 to initiate an alarm (e.g., output an alarm condition) and/or other indication from the controller 38 that a stationary object (e.g., a human body) has been detected (e.g., has been determined to be present) and may be in need of medical assistance (e.g., it has been determined that the object (e.g., a human body) has been stationary for at least a predetermined period of time). Additionally or alternatively, the I/O module 42 may receive communications from the user interface 46 to change a sensing parameter, and/or other configuration or other parameter. Alternatively or additionally, the I/O module 42 may communicate with another controller, which may be part of or in communication with a component of the sensing system 30, an overall building automation system that may include or be usable with the sensing system 30, an alarm system in communication with the sensing system 30, and/or other suitable component or system. The I/O module 42 may be any suitable type of I/O module configured to receive inputs and provide outputs. The I/O module 42 may be a wired I/O module, a wireless I/O module, or both a wired I/O module and a wireless I/O module.

The timer 44 may be incorporated into the controller 38 and/or may be a separate component from the controller 38. When the timer 44 is incorporated into the controller 38, the timer 44 may be integral to the processor 48 or a separate component. In operation, the processor 48 may add to, start, stop, and/or reset the timer 44 in response to input received from the first sensor 32, the second sensor 34, the optional third sensor 36, the user interface 46, and/or other components of the sensing system 30. The timer 44 may be a counter that increments, maintains, or resets in response to an input (e.g., from the processor 48 and/or other suitable components of the sensing system 30) and/or may have a running clock that starts, stops, and/or resets in response to an input (e.g., from the processor 48 and/or other suitable components of the sensing system 30).

The user interface 46 may be optional and when provided, the user interface 46 may be a suitable user interface that permits the controller 38 to display information, solicit information, and/or accept one or more user interactions with the controller 38. For example, the user interface 46 may permit a user to locally enter data such as timer set points, starting times, ending times, schedule times, threshold values, reference values, responses to alerts, inputs to address an alarm, and the like. Alternatively or in addition, the user interface 46 may display, sound, and/or otherwise initiate an alarm, display sensing system data, status and/or other information, etc. In one example, the user interface 46 may be a physical user interface that is accessible at the controller 38 and/or at an additional or alternative controller of a system (e.g., alarm system, building automation system, etc.) in communication with the sensing system 30, and may include a display and/or a distinct keypad. The display may be any suitable display. In some instances, a display may include or may be a liquid crystal display (LCD), and in some cases a fixed segment display or a dot matrix LCD display. In other cases, the user interface 46 may be a touch screen LCD panel that functions as both display and keypad. The touch screen LCD panel may be adapted to solicit values for a number of operating parameters and/or to receive such values, but this is not required. In still other cases, the user interface 46 may be a dynamic graphical user interface. In some cases, the user interface 46 may be part of a mobile device such as a mobile phone, a tablet computer, or any other suitable mobile device.

The processor 48 may operate in accordance with an algorithm that controls or at least partially controls one or more components of the sensing system 30. The processor 48, for example, may operate in accordance with a control algorithm that controls the timer 44 based on data and/or information received from the first sensor 32, the second sensor 34, and/or the optional third sensor 36. The processor 48 may also control the user interface 46 via the I/O module 42. At least a portion of the control algorithm(s) may be stored locally in the memory 50 of the controller 38 and, in some cases, may be received from an external web service over a network. The control algorithm(s) (or portion thereof) stored locally in the memory 50 of the controller 38 may be periodically updated in accordance with a predetermined schedule (e.g. once every 24 hours, 48 hours, 72 hours, weekly, monthly, etc.), updated in response to any changes to the control algorithm made by a user via the user interface 46, and/or updated in response to a user's request. In some cases, the control algorithm(s) may be configured to determine when a human is present in a space and remains stationary for at least a predetermined time, and initiate an alarm or otherwise request assistance when such a condition is detected.

The memory 50 of the illustrative controller 38 may be in communication with the processor 48. The memory 50 may be used to store any desired information, such as the aforementioned control algorithm(s), threshold values or reference values, limits, and the like. The memory 50 may be any suitable types of storage device including, but not limited to, RAM, ROM, EPROM, flash memory, a hard drive, and/or the like. In some cases, the processor 48 may store information within the memory 50, and may subsequently retrieve the stored information from the memory 50. The memory 50 may be or may include non-transitory computer readable media.

The first sensor 32 may be any suitable type of sensor. In one example, the first sensor 32 may be configured to sense a measure of a temperature (e.g., a surface temperature or other suitable temperature) of an object (e.g., a human or other suitable object) and provide an output related to the temperature of the object, even when the object is not moving. In some cases, the first sensor 32 may be a thermal sensor having one or more sensor pixels (e.g., an array of sensor pixels), where each sensor pixel may be configured to independently sense a measure of temperature (e.g., a measure of surface temperature or other suitable temperature) of objects in a field of view associated with the respective sensor pixel and provide a corresponding output that is related to the temperature of the object when the object is moving and when the object is not moving. Further, the first sensor 32 may have a field of view corresponding to a field of view of the sensing system 30, and each sensor pixel of the array of sensor pixels may cover a corresponding part of the field of view of the first sensor 32. The array of sensor pixels may collectively make up the field of view of the first sensor 32.

The first sensor 32 may have any suitable number of sensor pixels. For example, the first sensor 32 may include one (1) sensor pixel, two (2) sensor pixels, three (3) sensor pixels, four (4) sensor pixels, eight (8) sensor pixels, twelve (12) sensor pixels, sixteen (16) sensor pixels, twenty (20) sensor pixels, more than twenty (20) sensor pixels, and/or other suitable numbers of sensor pixels. In some cases, the first sensor may have twenty (20) or fewer sensor pixels, sixteen (16) or fewer sensor pixels, or even eight (8) or fewer sensor pixels, to limit the resolution of the first sensor particularly where privacy is a concern such as in a bathroom.

One example thermal sensor may be sensitive to infrared light, such as a sensor utilizing infrared microelectromechanical systems (MEMS) sensing technology having an array of sensor pixels (e.g., a D6T thermal sensor manufactured by OMRON Electronic Components or other infrared sensitive thermal sensor) and/or one or more other suitable thermal sensors configured to detect a presence of a moving human and a presence of a non-moving human. The pixels of the thermal sensor may be configured in a 2×2 array, a 4×4 array, a 1×8 array, a 2×12 array and/or other suitable configuration of pixels. An example field of view of each pixel may be between about 44.2 degrees on center in an x-direction and about 45.7 degrees on center in a y-direction, but other fields of view may be established, as desired. In some cases, the array of sensor pixels may be able to sense temperatures in the range of about 41 to about 131 degrees Fahrenheit and/or in one or more other suitable temperature ranges. When the sensing system 30 includes two or more sensor pixels, the controller 38 and/or the first sensor 32 may be configured to determine whether an object (e.g. human) is present based on the output related to the temperature of the object from at least two of the two or more of the sensor pixels. The first sensor 32, however, may take on one or more other thermal sensor configurations. Further, although only a single first sensor 32 is shown, additional first sensors 32 may be utilized in combination to ensure an entire space or at least a desired portion of a space is monitored by the first sensor(s) 32.

The second sensor 34 may be any suitable type of sensor. In one example, the second sensor 34 may be configured to detect motion of an object (e.g., a human or other suitable object) and output a signal indicating movement and/or non-movement of the object. In some cases, the second sensor 34 may be a motion sensor configured to sense motion of objects within the defined space. The motion sensor may be a passive infrared (PIR) motion sensor and/or other suitable type of motion sensor. Although only a single second sensor 34 is shown, additional second sensors 34 may be utilized in combination to ensure an entire space or at least a desired portion of a space is monitored by the second sensor(s) 34.

The sensing system 30 may utilize the two types of sensors discussed above with the first sensor 32 and the second sensor 34, where the first sensor 32 may be configured to detect a presence of a human in a space even when motionless and the second sensor 34 is configured to sense movement of the detected human. The controller 38 may receive outputs from the first sensor 32 and the second sensor 34 and initiate an alarm and/or request medical assistance when a human is present and has remained motionless for at least a threshold period of time. In some cases, the third sensor 36 may be used as well. For example, the controller may only issue an alarm and/or request medical assistance when the door is in the closed position.

Figure 3:
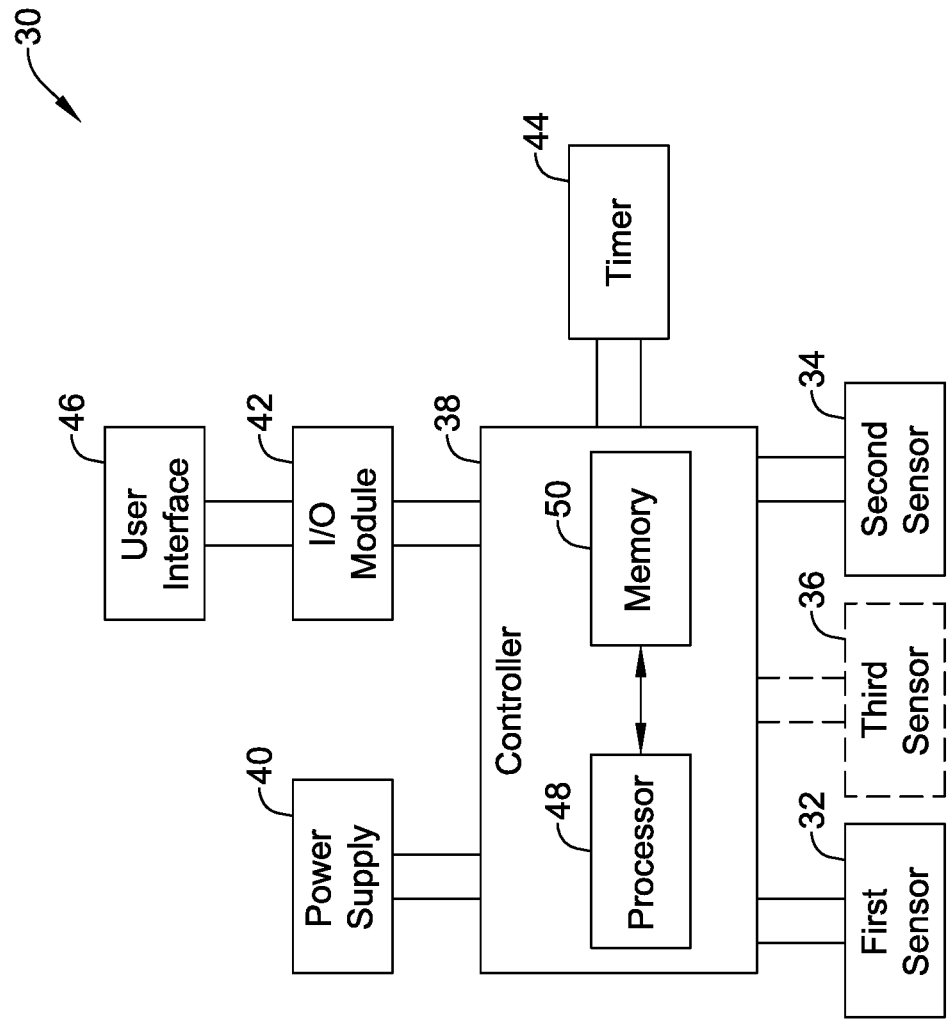
FIG. 3 is a schematic block diagram of an illustrative sensing system.

FIG. 3 is a schematic block diagram of the illustrative sensing system 30 with the third sensor 36, where the third sensor 36 is depicted in broken lines to indicate the third sensor 36 is an optional component of the sensing system 30. In some cases, the third sensor 36 may be a door sensor configured to sense a position of a door relative to a doorway (e.g., a position of a bathroom entry door, a position of a stall entry door, and/or a position of one or more other suitable doors). Although the third sensor 36, when included, may be utilized in one or more of a variety of manners, the third sensor 36 may be utilized to assist in determining a presence of a human. For example, the third sensor 36 may sense a position of a door and the controller 38 may be configured to detect a pattern in outputs from the third sensor 36 to determine the presence of a human in the space. In response, the controller 38 may initiate analysis of data or information from the first sensor 32 and/or initiate a different analysis of data or information from the first sensor 32 to confirm a presence of a human in the space. Alternatively, the controller 38 may utilize an output from the third sensor 36 to confirm a human may be present in a space after determining a human is present based on outputs from the first sensor 32 or, as discussed below with respect to FIG. 6, to determine a human may be present in the space even though the output from the first sensor 32 indicates no human is present in the space. The third sensor 36, however, may be omitted and/or used in one or more other suitable manners. Further, although one third sensor 36 is shown, additional third sensors 36 may be utilized if desired. In one example, if two doors must be passed through to reach the bathroom or a stall of the bathroom, a door sensor may be placed in each of the two doors. By noting the order in which the doors are opened and closed, it can be surmised whether the user is entering the bathroom or exiting the bathroom. For example, when a user enters the bathroom, the bathroom door may be first opened, followed by the stall door. When the user exits the bathroom, the stall door may be first opened, followed by the bathroom door. This is just one example.

Figure 4:
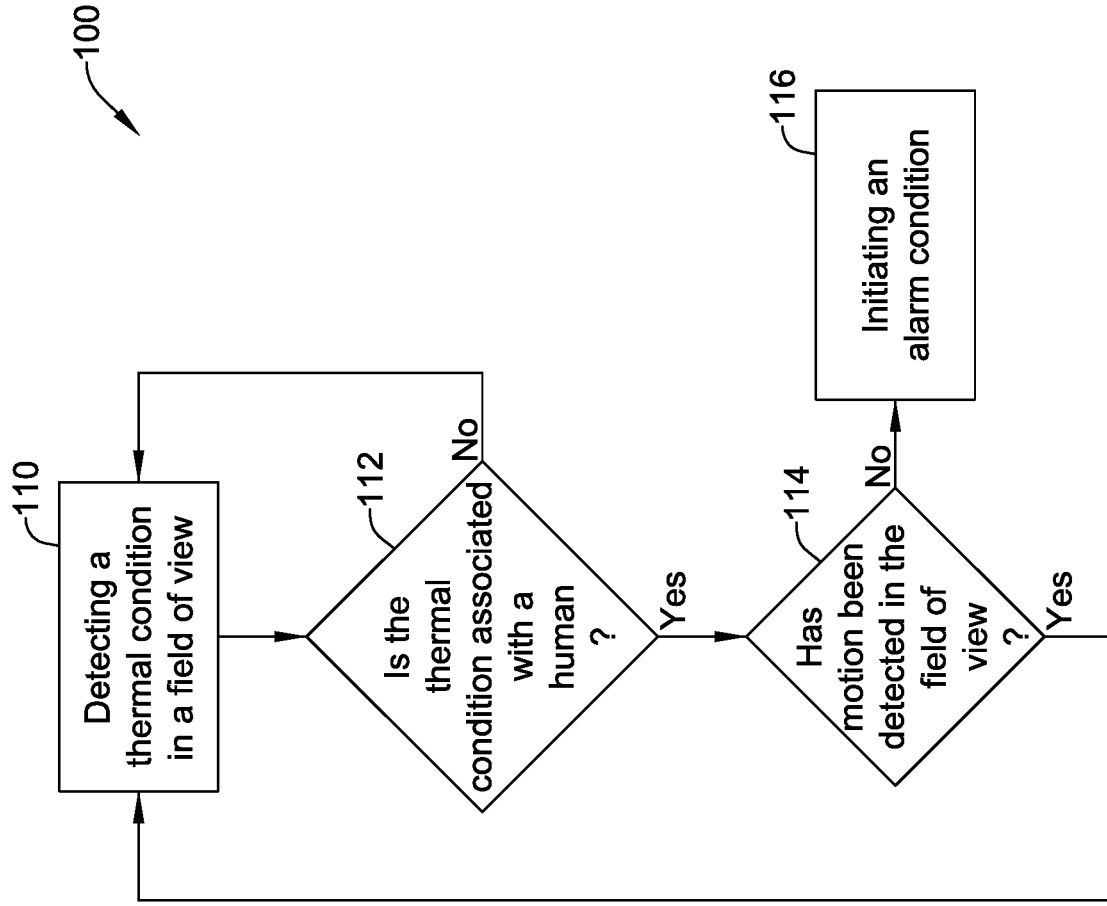
FIG. 4 is a schematic flow diagram of an illustrative method of detecting a stationary object, sometimes using one of the illustrative sensing systems of FIGS. 1-3.

FIG. 4 depicts a schematic flow diagram of a method 100 of detecting a stationary human in a defined space, such as a bathroom or other suitable space, using a sensing system (e.g., the sensing system 30 or other suitable sensing system). The method 100 may be implemented using a controller (e.g., the controller 38 or other suitable controller). The method 100 may include detecting 110 a thermal condition in a field of view of a first sensor (e.g., a field of view of the first sensor 32 and/or other suitable sensor). In some cases, detecting a thermal condition in a field of view of the first sensor may include detecting measures related to a surface temperature or other suitable temperature of objects in the field of view of the sensor. In some cases, the detected measures related to a surface temperature or other suitable temperature of objects in the field of view may be considered a thermal signature. Then, a determination 112 of whether the detected thermal condition is associated with a human presence may be made. In some cases, whether a thermal condition is associated with a human presence may be determined by comparing sensed thermal conditions over time, as discussed in greater detail below. When the detected thermal conditions are determined to not be associated with a human presence in the space, the method 100 may return to detecting 110 the thermal condition in the field of view.

When the detected thermal condition has been determined to be associated with a human, a determination 114 of whether motion has been detected in the field of view may be made. In some cases, a determination 114 of whether motion has been detected in the field of view may be made independent of data determining a thermal condition in the field of view and may be based on data or information from a second sensor (e.g., the second sensor 34 and/or other suitable second sensor). When motion has been detected in the field of view, the method 100 may return to detecting 110 the thermal condition in the field of view. When motion has not been detected in the field of view, an alarm condition may be initiated 116. In some cases, once a processor (e.g., the processor 48 and/or other suitable processor) determines a presence of a human in a space and determines motion has not been detected (e.g., motion has not been detected for a predetermined period of time or otherwise has not been detected), the processor may initiate the alarm condition, which may include, but it is not limited to, initiating an alarm, initiating a request for medical assistance, starting a timer, incrementing a timer, and/or performing one or more other functions related to an alarm. In some cases and although it is not depicted in FIG. 4, if an alarm has not been triggered after initiating an alarm condition (e.g., the timer has not reached a threshold value), the method 100 may return to detecting 110 the thermal condition in the field of view and repeat the method 100 until an alarm has been initiated.

Figure 5:
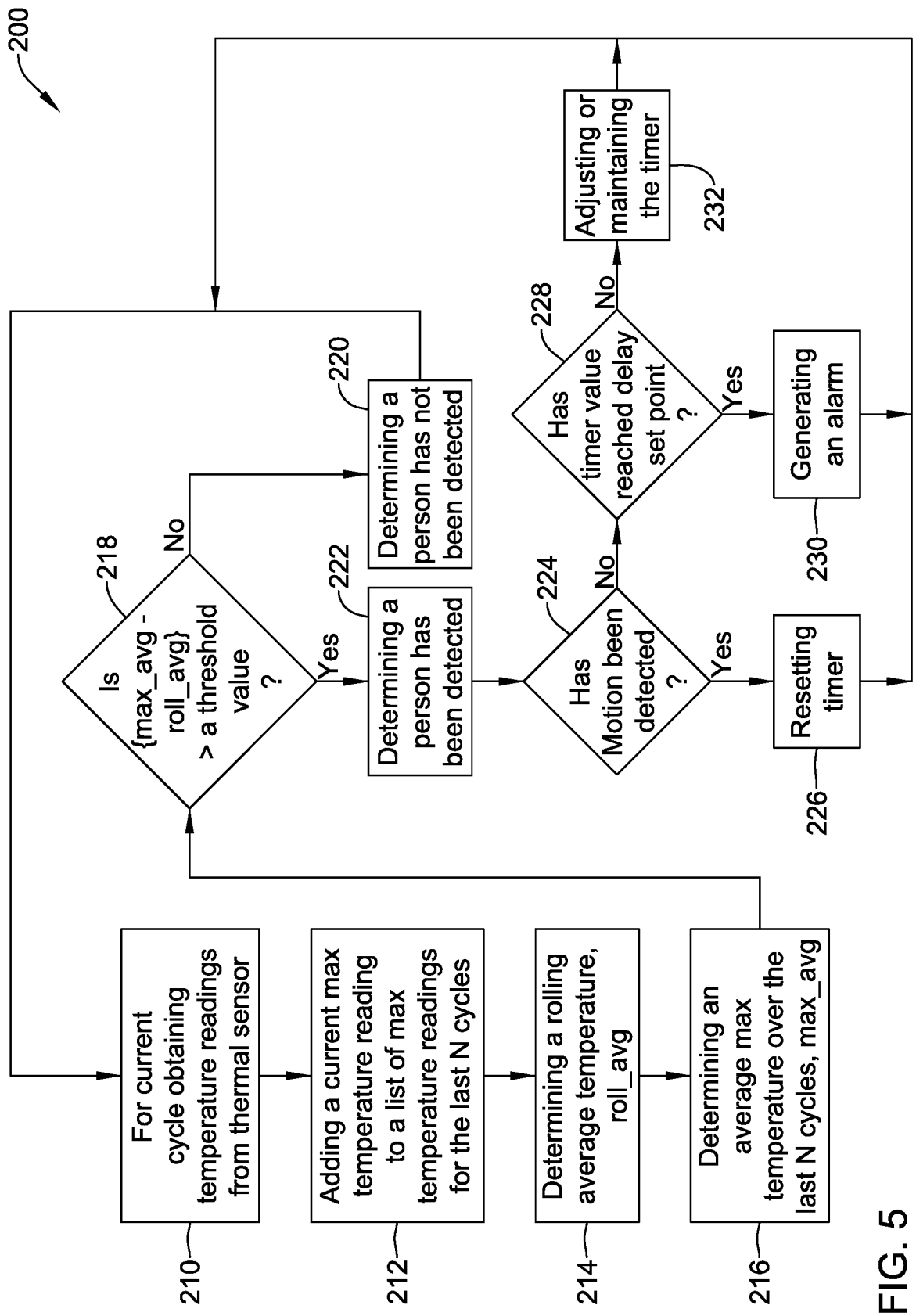
FIG. 5 is a schematic flow diagram of an illustrative method of detecting a stationary object, sometimes using one of the illustrative sensing systems of FIGS. 1-3.

FIG. 5 depicts a schematic flow diagram of a method 200 of implementing detection of a stationary human in a defined space, such as a bathroom or other suitable space, with a sensing system (e.g., the sensing system 30 or other suitable sensing system). The method 200 may be implemented using a controller (e.g., the controller 38 or other suitable controller). The method 200 may include obtaining 210 temperature readings from a first sensor (e.g., the first sensor 32 or other suitable sensor) for a current cycle, $C_i$. A cycle may be a single turn through the loop of method 200, as discussed here, where the loop may be continuously run when the sensing system is operating and/or run at particular intervals (e.g., predetermined intervals or intervals calculated in real time based on sensed data or information). The obtained temperature readings may be stored in memory (e.g., the memory 50 or other suitable memory) and a processor (e.g., the processor 48 or other suitable processor) may access the stored temperature readings to perform the algorithms discussed herein. In some cases, the processor and memory may be part of the controller.

The first sensor may be a thermal sensor configured to obtain (e.g., sense) a measure of or related to a temperature (e.g., a surface temperature) of an object and provide an output related to the surface temperature of the object even when the object is not moving. The first sensor may include an array of sensor pixels and obtain a temperature reading for each sensor pixel in the array. In some cases, once the temperature readings for the current cycle, $C_i$, are obtained, the temperature readings may be translated or converted into a desired data type or configuration. In some cases, the temperature readings may be converted into a matrix, where each cell of the matrix is associated with a corresponding sensor pixel of the sensor pixel array.

The method 200 may include adding 212 a current maximum temperature reading, $Tmax_i$, from the temperature readings obtained from the thermal sensor for the current cycle, $C_i$, to a list of maximum temperature readings for the last N cycles (e.g. a N cell array). The value of N may be any suitable number of cycles including, but not limited to, one (1) cycle, two (2) cycles, three (3) cycles, four (4) cycles, five (5) cycles, ten (10) cycles, twenty (20) cycles, fifty (50) cycles, one hundred (100) cycles, and/or other suitable number of cycles.

The method 200 may include determining 214 a rolling average of temperature readings A rolling average of temperature readings may be determined using one or more techniques. In one example, the controller may utilize the following equations to determine a rolling average of temperature readings:

$$i=1, \text{Roll\_avg}_i = Tmax_i$$

$$i>1, \text{Roll\_avg}_i = (Tmax_i/3600) + ((3599 * \text{Roll\_avg}_{i-1})/3600)) \quad (1)$$

In equation (1), i is the current cycle, i–1 is the cycle immediately preceding the current cycle, $\text{Roll\_avg}_i$ is a rolling average of temperature readings as of the current cycle, $\text{Roll\_avg}_{i-1}$ was the rolling average of temperature readings as of the cycle immediately before the current cycle, and $Tmax_i$ is a maximum temperature reading taken during the current cycle, $C_i$. The rolling average from equation (1) may establish an ambient temperature within the field of view of the first sensor in a way that filters effects of normal fluctuations in temperature (e.g. space temperature) when an object to be detected is not present in the space. Although equation (1) may be an algorithm for identifying a rolling average of temperature readings, other techniques may be utilized to determine a rolling average of temperature readings over a desired number of cycles.

The method 200 may include calculating or determining 216 an average maximum temperature reading, $Tmax_{avg}$ over the last N cycles. In some cases, the average maximum temperature reading over the last N cycles may be determined by summing the maximum temperature readings over the last N cycles and dividing that sum by the number of cycles, N. The average maximum temperature may be used to filter minor fluctuations in current readings to reduce false detections of the object in the space by the sensing system.

The method 200 may include determining 218 whether $Tmax_{avg}$ minus $\text{Roll\_avg}_i$ has gone beyond or otherwise exceeds a threshold value (e.g., a reference value), where the threshold value may be set to determine whether a human body is present in a defined space. The threshold value may be predetermined and programmed into the controller 38. Alternatively or in addition, the threshold value may be set by a user via the user interface 46. In some cases, the threshold value may calculated and set by the controller 38 based on data and/or information received from the first sensor over time. When $Tmax_{avg}$ minus $\text{Roll\_avg}_i$ has not gone beyond or otherwise exceeds the threshold value or reference value, it may be determined 220 that a human has not been detected in the space and the loop of the method 200 may start a new cycle by obtaining 210 temperature readings from the first sensor.

When $Tmax_{avg}$ minus $\text{Roll\_avg}_i$ has gone beyond or exceeds the threshold value or reference value, it may be determined 222 that a human has been detected and the method 200 may move to determining 224 whether motion has been detected. Motion may be detected using a second sensor (e.g., the second sensor 34 or other suitable sensor) configured to detect motion of the human (e.g., an object) and to output a signal indicating movement and/or non-movement of the human. In one example, the second sensor may be a PIR sensor. In determining whether motion has been detected, a determination by the second sensor and/or the controller may be made as to whether motion has been detected over a previously predetermined time period. In one example, the second sensor and/or the controller may identify a last detection of motion by the second sensor and determine if it occurred during the predetermined time period. Determining whether motion occurred during the predetermined time period may facilitate determining whether the detected object is using the space as intended (e.g., when motion is detected) or if the detected object is incapacitated and/or in need of medical assistance (e.g., when motion is not detected)

The predetermined time period during which a determination as to whether motion was detected is made, may be any suitable period of time including, but not limited to, less than ten (10) seconds, thirty (30) seconds, one (1) minute, two (2) minutes, three (3) minutes, five (5) minutes, ten (10) minutes, longer than ten (10) minutes, and/or other suitable time period. In some cases, the predetermined time period may be omitted. In some cases, the predetermined time period may begin once determining a human is present.

If motion has been detected, a timer (e.g., the timer 44 or other suitable timer) may be reset 226, assuming the timer was started or incremented at least once, and the method 200 may start a new cycle by obtaining 210 temperature readings from the first sensor. If motion has not been detected, a determination 228 as to whether a value of the timer has reached a delay set point or timer threshold value (e.g., a timer reference value) may be made. The delay set point or timer threshold value may be predetermined and programmed into the controller 38. Alternatively or in addition, the delay set point or timer threshold value may be set by a user via the user interface 46.

The method 200 may include generating 230 an alarm and/or a request for medical assistance and returning to obtaining 210 temperature readings for a further cycle when the value of the timer has reached the delay set point or timer threshold. The alarm and/or request for medical assistance may be initiated and/or generated through an I/O module (e.g., the I/O module 42 or other suitable I/O module) and/or through one or more other communications ports. In some cases, the alarm and/or request for medical assistance may go to a user interface, a building alarm system, and/or a building automation system. When the timer has not reached the delay set point or timer threshold value, the timer may be incremented, initiated, and/or maintained to continue running 232 and the method may return to obtaining 210 temperature readings for a further cycle.

The following is an example implementation of the method 200 for detecting a presence of a stationary human in a space based on obtained readings from sensors of a sensing system, in which it is determined no human is present in the space. The readings obtained (in degrees Celsius) during a current cycle may be arranged in the following order, or other order, so as to coincide with a sensor pixel position in a 4×4 array of sensor pixels:
20.0 19.0 18.0 17.0
20.0 19.0 18.0 17.0
19.0 18.0 18.0 17.0
18.0 17.0 17.0 16.0
From this a maximum temperature reading for a current cycle, $Tmax_i$, may be determined, which is 20.0 in this example. If this is the first cycle run upon starting up the sensing system, the rolling average of the current cycle, $Roll\_avg_i$, is set to $Tmax_i$. If the current cycle is not the first cycle run upon starting up the sensing system and the rolling average as of the previous cycle, $Roll\_avg_{i-1}$, is equal to 19.3, the rolling average for the current cycle, $Roll\_avg_i$, as obtained from equation (1) equals:

$$Roll\_avg_i=(20.0/3600)+((3599*19.3)/3600)$$

$$Roll\_avg_i=0.005555+19.2946388$$

$$Roll\_avg_i=19.30019$$

In this example, N has been set to ten (10) and the maximum temperature readings, Tmax, for the last ten (10) cycles are 20.0, 19.0, 19.0, 20.0, 20.0, 20.0, 20.0, 20.0, 20.0, 20.0, which gives us an average maximum temperature, $Tmax_{avg}$, of 19.8. Once the rolling average of the temperature readings is known and the average maximum temperature over the last N cycles is known, the difference between the rolling average of the temperature readings and the average maximum temperature over the last N cycles may be determined and compared to a threshold value (e.g., a reference value), where the threshold value is equal to 2.0 in the example, as follows:

$$Tmax_{avg}-Roll\_avg_i=19.8-19.30019=0.49981$$

The threshold value in this example is equal to 2.0 and 0.49981 is less than 2.0 (e.g., the threshold value), such that it may be determined a human has not been detected in the space and a new cycle may be started.

The following is an example implementation of the method 200 for detecting a presence of a stationary human in a space based on obtained readings from sensors of a sensing system, in which it is determined a human is present in the space. Similar to as discussed above, the readings obtained (in degrees Celsius) during a current cycle may be arranged in the following order so as to coincide with a sensor pixel position in a 4×4 array of sensor pixels:
20.0 19.0 18.0 17.0
22.0 23.0 21.0 24.0
23.0 25.0 28.0 26.0
23.0 25.0 20.0 16.0
From this a maximum temperature reading for a current cycle, $Tmax_i$, may be determined, which is 28.0 in this case. If this is the first cycle run upon starting up the sensing system, the rolling average as of the current cycle, $Roll\_avg_i$, is set to $Tmax_i$ (e.g., 28.0). If the current cycle is not the first cycle run upon starting up the sensing system and the rolling average of the previous cycle, $Roll\_avg_{i-1}$, is equal to 20.256845, the rolling average for the current cycle, $Roll\_avg_i$, as obtained from equation (1) equals:

$$Roll\_avg_i=(28.0/3600)+((3599*20.256845)/3600)$$

$$Roll\_avg_i=0.007777+20.251218$$

$$Roll\_avg_i=20.258995$$

In the example, N has been set to ten (10) and the maximum temperature readings, Tmax for the last ten (10) cycles are 28.0, 26.0, 28.0, 25.0, 28.0, 20.0, 20.0, 20.0, 20.0, 20.0, which gives us an average maximum temperature, $Tmax_{avg}$, of 23.5. Once the rolling average of the temperature readings is known and the average maximum temperature over the last N cycles is known, the difference between the rolling average of the temperature readings and the average maximum temperature over the last N cycles may be determined and compared to a threshold value (e.g., a reference value), where the threshold value is equal to 2.0 in the example, as follows:

$$Tmax_{avg}-Roll\_avg_i=23.5-20.258995=3.241005$$

The threshold value in the example is equal to 2.0 and 3.241005 is greater than 2.0 (e.g., the threshold value), such that it may be determined a human has been detected in the space and it the method may move onto determining whether motion has been detected in the space and whether a timer has reached a delay set point or timer threshold in the event no motion has been detected.

Figure 6:
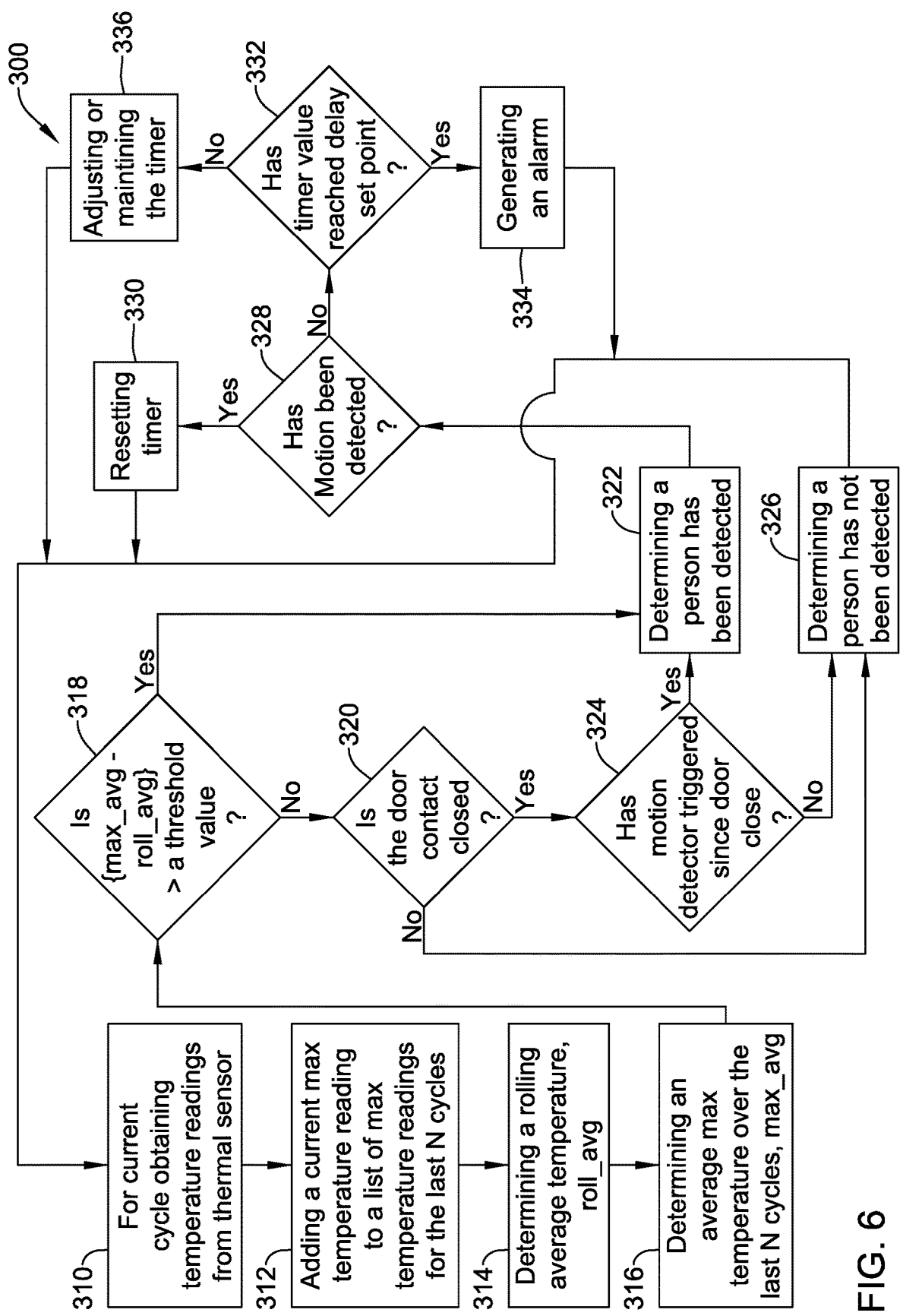
FIG. 6 is a schematic flow diagram of an illustrative method of detecting a stationary object, sometimes using one of the illustrative sensing systems of FIGS. 1-3.

FIG. 6 depicts a schematic flow diagram of a method 300 of implementing detection of a stationary human in a defined space, such as a bathroom or other suitable space, with a sensing system (e.g., the sensing system 30 or other suitable sensing system). The method 300 may be similar to the method 200, but includes an example usage of a third sensor (e.g., the third sensor 36 or other suitable sensor) that is configured to sense a position of a door for the defined space, and the details discussed above with respect to the method 200 are incorporated into the method 300 even if not repeated herein. Similar to the method 200, the method 300 may be implemented using a controller (e.g., the controller 38 or other suitable controller).

The method 300 may include obtaining 310 temperature readings from a first sensor for a current cycle, $C_i$. The obtained temperature readings may be stored in memory (e.g., the memory 50 or other suitable memory) and a processor (e.g., the processor 48 or other suitable processor) may access the stored temperature reading to perform the algorithms discussed herein.

The first sensor may be a thermal sensor configured to obtain (e.g., sense) a measure of or related to a temperature (e.g., a surface temperature) of an object and provide an output related to the surface temperature of the object even when the object is not moving. The first sensor may include an array of sensor pixels and obtain a temperature reading for each sensor pixel in the array. In some cases, once the temperature readings for the current cycle, $C_i$, are obtained, the temperature readings may be translated or converted into a desired data type or configuration. In some cases, the temperature readings may be converted into a matrix, where each cell of the matrix is associated with a sensor pixel of the sensor pixel array.

The method 300 may include adding 312 a current maximum temperature reading, $Tmax_i$, from the temperature readings obtained from the thermal sensor for the current cycle, $C_i$, to a list of maximum temperature readings for the last N cycles. The method 300 may further include determining 314 a rolling average of temperature readings. A rolling average of temperature readings may be determined using one or more techniques, as discussed above with respect to the method 200.

The method 300 may include calculating or determining 316 an average maximum temperature reading, $Tmax_{avg}$, over the last N cycles. In some cases, the average maximum temperature reading over the last N cycles may be determined by summing the maximum temperature readings over the last N cycles and dividing that sum by the number of cycles N.

The method 300 may include determining 318 whether $Tmax_{avg}$ minus $Roll\_avg_i$ has gone beyond or exceeds a threshold value (e.g., a reference value), where the threshold value may be set to determine whether a human body is present in the defined space. When $Tmax_{avg}$ minus $Roll\_avg_i$ has not reached or gone beyond or exceeded the threshold value, it may be determined 320 whether a door contact is closed. Whether a door contact is closed may be determined from an output of the third sensor, where the third sensor forms a door contact with a door sensing element on a doorway and a door sensed element on the door. Other configurations, however, of the third sensor are contemplated. If the door contact is not closed (e.g., the door is open), it may be determined 322 that a human has not been detected in the space and the loop of the method 300 may start a new cycle by obtaining 310 temperature readings from the first sensor. If the door contact is closed (e.g., the door is closed), it may be determined 324 whether outputs form the second sensor (e.g., a motion detecting sensor) indicate motion has been detected since the output from the third sensor last indicated the door contact is closed. If no motion has been detected since the output from the third sensor last indicated the door contact is closed, it may be determined 322 that a human has not been detected in the space and the loop of the method 300 may start a new cycle by obtaining 310 temperature readings from the first sensor.

When $Tmax_{avg}$ minus $Roll\_avg_i$ has gone beyond or exceeds the threshold value or it has been determined that the door contact is closed and motion has been detected since the output form the third sensor last indicated the door contact is closed, it may be determined 326 that a human has been detected and the method 300 may move to determining 328 whether motion has been detected. If motion has been detected, a timer (e.g., the timer 44 or other suitable timer) may be reset 330, assuming the timer was started or incremented at least once, and the method 300 may start a new cycle by determining 310 temperature readings from the first sensor. If motion has not been detected, a determination 332 as to whether a value of the timer has reached a delay set point or timer threshold value (e.g., a timer reference value) may be made. The method 300 may include generating 334 an alarm and/or a request for medical assistance when the value of the timer has reached the delay set point or timer threshold and returning to obtaining 310 temperature readings for a further cycle. When the timer has not reached the delay set point or timer threshold value, the timer may be incremented, initiated, and/or maintained to continue running 336 and the method may return to obtaining 310 temperature reading for a further cycle.

To recap, a sensing system may include a first sensor, a second sensor, and a controller operatively coupled to the first sensor and the second sensor. The first sensor may be configured to sense a measure of a surface temperature of an object and provide an output related to the surface temperature of the object even when the object is not moving. The second sensor may be configured to detect motion of the object and to output a signal indicating movement and/or non-movement of the object. The controller may be configured to determine whether an object is present based on the output related to the surface temperature of the object from the first sensor and when the object is determined to be present, determine when the object has been stationary for at least a predetermined period of time based on the output indicating movement and/or non-movement of the object from the second sensor. The controller may be further configured to output an alarm condition when the object is determined to be present and when it is determined that the object has been stationary for at least a predetermined period of time.

In some cases, the controller may be configured to compare the output related to the surface temperature of the object from the first sensor to a reference value when determining whether an object is present.

In some cases, the controller may be configured to determine that an object is present when the output related to the surface temperature of the object from the first sensor exceeds the reference value.

In some cases, the object is a human body, and the reference value is set to determine whether a human body is present.

In some cases, the first sensor may comprise two or more sensor pixels each configured to independently sense a measure of the surface temperature of the object and provide a corresponding output that is related to the surface temperature of the object even when the object is not moving.

In some cases, the controller may be configured to determine whether an object is present based on the output related to the surface temperature of the object from two or more of the sensor pixels of the first sensor.

In some cases, the sensing system may have a field of view and each sensor pixel of the two or more sensor pixels may a field of view that corresponds to less than the entire field of view of the sensing system.

In some cases, the two or more sensor pixels is less than or equal to 16 pixels.

In some cases, the first sensor may be sensitive to infrared light.

In some cases, the second sensor may be a passive infrared (PIR) motion sensor.

In some cases, the sensing system may further include a door sensor. The controller may be operatively coupled to the door sensor and may be configured to determine when it is determined that the object is present and has been stationary for at least a predetermined period of time when a door is closed.

The sensing system may further comprising a timer. After the object is determined to be present, and the object has been stationary, the controller may be configured to start the timer. When movement of the object is detected by the second sensor before the timer expires, the controller may reset the timer. When movement of the object is not detected by the second sensor before the timer expires, the controller may output the alarm condition.

A method of detecting a stationary human in a defined space may include determining whether a detected thermal signature in a field of view is associated with a human presence in the defined space. When the detected thermal signature in the field of view is not associated with a human presence, repeating the determining whether a detected thermal signature in a field of view is associated with a human presence in the defined space. When the detected thermal signature in the field of view is associated with a human presence, determining whether motion has been detected in the field of view. When motion has not been detected in the field of view for at least a predetermined amount of time, outputting an alarm condition.

In some cases, determining whether the detected thermal signature in the field of view may be associated with a human presence in the defined space comprises comparing a value related to a maximum value from a thermal sensor with a value related to an average of values from the thermal sensor.

In some cases, determining whether the detected thermal signature in the field of view is associated with a human presence in the defined space may include determining if a difference between the value related to the maximum value from the thermal sensor and the value related to an average of values from the thermal sensor has reached or exceeded a threshold value.

In some cases, the thermal signature may be detected using an infrared sensor.

In some cases, motion may be detected using a passive infrared (PIR) sensor.

A system for sensing a motionless human in a defined space may include a thermal sensor, a motion sensor, and a controller in communication with the thermal sensor and the motion sensor. The thermal sensor may have an array of sensor pixels, where each sensor pixel may be configured to sense surface temperature of objects in a field of view associated with the sensor pixel. The motion sensor configured to sense motion of objects within the defined space. The controller may be configured to determine when a human is in the defined space based on an output from the thermal sensor. When a human is determined to be in the defined space, the controller may determine when the human moves in the defined space based on an output from the motion sensor. Further controller may be configured to determine when a human is present in the defined space and has not moved in the defined space for at least a predetermined amount of time, and output an alarm condition after it is determined that a human is present in the defined space and has not moved in the defined space for at least a predetermined amount of time.

In some cases, the thermal sensor may include less than 20 sensor pixels.

In some cases, the thermal sensor may be configured to sense surface temperature of objects in the field of view even when the objects are not moving. The motion sensor may be configured to detect motion of objects in the field of view and to output a signal indicating movement and/or non-movement of the objects.

Although the methods described herein are described in one or more orders, it is contemplated that one or more steps of the method may be performed in other suitable orders including, but not limited before, after, or simultaneously with one or more other steps. Additionally or alternative, the methods described herein may include one or more additional or alternative steps with respect to the steps described.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A sensing system comprising:
    a first sensor configured to sense a measure of a surface temperature of an object and provide an output related to the surface temperature of the object even when the object is not moving;
    a second sensor configured to detect motion of the object and to output a signal indicating movement and/or non-movement of the object; and
    a controller operatively coupled to the first sensor and the second sensor, wherein the controller is configured to:
        determine whether an object is present based on the output related to the surface temperature of the object from the first sensor;
        when the object is determined to be present, determine when the object has been stationary for at least a predetermined period of time based on the output indicating movement and/or non-movement of the object from the second sensor; and
        output an alarm condition when the object is determined to be present and when it is determined that the object has been stationary for at least a predetermined period of time.

2. The sensing system of claim 1, wherein the controller is configured to compare the output related to the surface temperature of the object from the first sensor to a reference value when determining whether an object is present.

3. The sensing system of claim 2, wherein the controller is configured to determine that an object is present when the output related to the surface temperature of the object from the first sensor exceeds the reference value.

4. The sensing system of claim 2, wherein the object is a human body, and the reference value is set to determine whether a human body is present.

5. The sensing system of claim 1, wherein the first sensor comprises two or more sensor pixels each configured to independently sense a measure of the surface temperature of the object and provide a corresponding output that is related to the surface temperature of the object even when the object is not moving.

6. The sensing system of claim 5, wherein the controller is configured to determine whether an object is present based on the output related to the surface temperature of the object from two or more of the sensor pixels of the first sensor.

7. The sensing system of claim 5, wherein the sensing system has a field of view and each sensor pixel of the two or more sensor pixels has a field of view that corresponds to less than the entire field of view of the sensing system.

8. The sensing system of claim 5, wherein the two or more sensor pixels is less than or equal to 16 pixels.

9. The sensing system of claim 1, wherein the first sensor is sensitive to infrared.

10. The sensing system of claim 9, wherein the second sensor is a PIR motion sensor.

11. The sensing system of claim 1, further comprising a door sensor, wherein the controller is operatively coupled to the door sensor and is configured to determine when it is determined that the object is present and has been stationary for at least a predetermined period of time when a door is closed.

12. The sensing system of claim 1, further comprising a timer, wherein:
    after the object is determined to be present, and the object has been stationary, the controller is configured to start the timer;
    when movement of the object is detected by the second sensor before the timer expires, the controller is configured to reset the timer;
    when movement of the object is not detected by the second sensor before the timer expires, the controller is configured to output the alarm condition.

13. A method of detecting a stationary human in a defined space, the method comprising:
    determining whether a detected thermal signature in a field of view is associated with a human presence in the defined space;
    when the detected thermal signature in the field of view is not associated with a human presence, repeating the determining whether a detected thermal signature in a field of view is associated with a human presence in the defined space;
    when the detected thermal signature in the field of view is associated with a human presence, determining whether motion has been detected in the field of view; and
    when motion has not been detected in the field of view for at least a predetermined amount of time, outputting an alarm condition.

14. The method of claim 13, wherein determining whether the detected thermal signature in the field of view is associated with a human presence in the defined space comprises comparing a value related to a maximum value from a thermal sensor with a value related to an average of values from the thermal sensor.

15. The method of claim 14, wherein determining whether the detected thermal signature in the field of view is associated with a human presence in the defined space further comprises determining if a difference between the value related to the maximum value from the thermal sensor and the value related to an average of values from the thermal sensor has reached or exceeded a threshold value.

16. The method of claim 13, wherein the thermal signature is detected using an infrared sensor.

17. The method of claim 16, wherein motion is detected using a passive infrared (PIR) sensor.

18. A system for sensing a motionless human in a defined space, the system comprising:
    a thermal sensor having an array of sensor pixels, where each sensor pixel is configured to sense surface temperature of objects in a field of view associated with the sensor pixel;
    a motion sensor configured to sense motion of objects within the defined space;
    a controller in communication with the thermal sensor and the motion sensor, wherein the controller is configured to:
        determine when a human is in the defined space based on an output from the thermal sensor;
        when a human is determined to be in the defined space, determine when the human moves in the defined space based on an output from the motion sensor;
        determine when a human is present in the defined space and has not moved in the defined space for at least a predetermined amount of time; and
        output an alarm condition after it is determined that a human is present in the defined space and has not moved in the defined space for at least a predetermined amount of time.

19. The system of claim 18, wherein the thermal sensor comprises less than 20 sensor pixels.

20. The system of claim 18, wherein the thermal sensor is configured to sense surface temperature of objects in the field of view even when the objects are not moving, and wherein the motion sensor is configured to detect motion of objects in the field of view and to output a signal indicating movement and/or non-movement of the objects.

* * * * *